H. Mansfield,
Cage Trap.
N° 67,893. Patented Aug. 20, 1867.

Witnesses
James H. Carport
Walter Scott

Inventor
H. Mansfield
By his attorney
Geo L. Chapin

United States Patent Office.

H. MANSFIELD, OF WARSAW, INDIANA.

Letters Patent No. 67,893, dated August 20, 1867.

IMPROVEMENT IN ANIMAL TRAPS.

*The Schedule referred to in these Letters Patent and making part of the same.*

TO ALL WHOM THIS MAY CONCERN:

Be it known that I, H. MANSFIELD, of Warsaw, in the county of Kosciusko, and State of Indiana, have invented a new and improved Rat-Trap; and I do hereby declare that the following is a full, clear, and exact description of the construction and operation of the same, reference being had to the accompanying drawings and letters of reference marked thereon, making a part of this description, in which—

Figure 1:
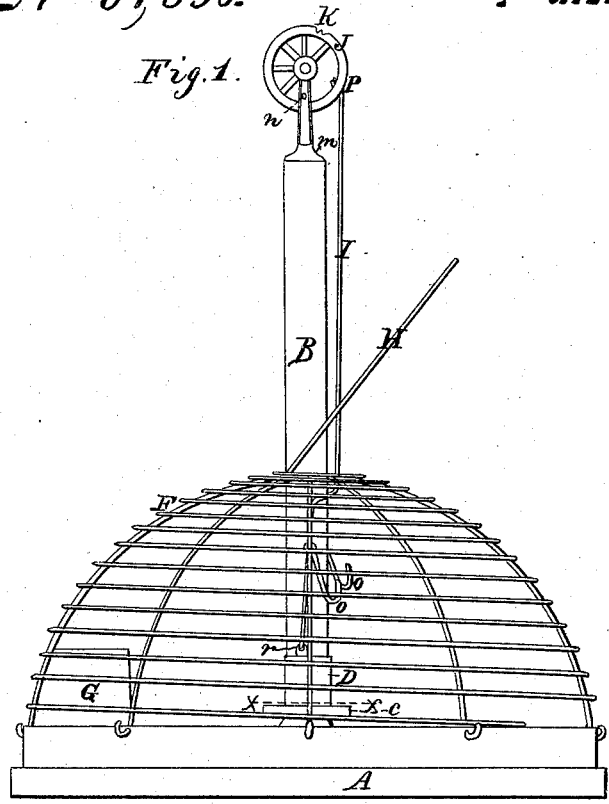

Figure 1 is an elevation of my trap.

Figure 2:
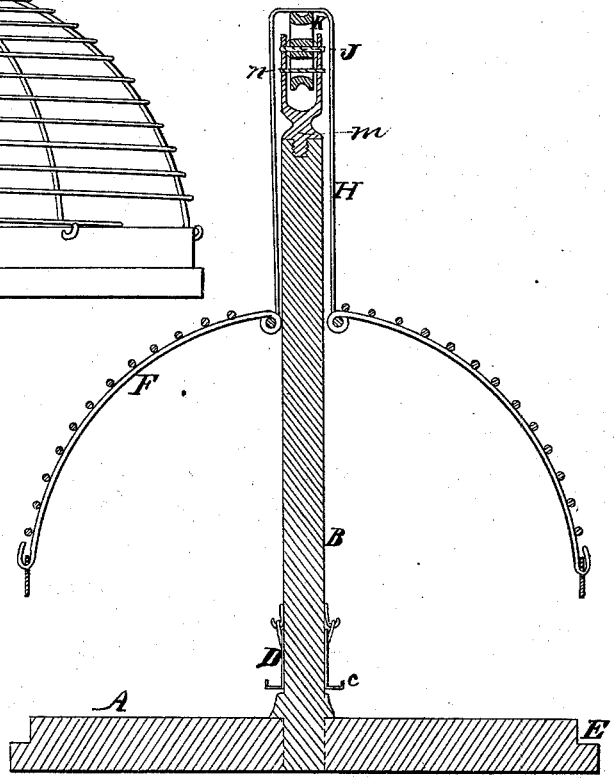

Figure 2, a section taken transversely to fig. 1.

Figure 3:

Figure 3, a horizontal section taken through the central post above the cup, and at the point shown by line $x\ x$.

The nature of my invention consists in the use of a rabbeted circular base, supporting a post, having on its top a pulley, to which is attached a cord, extending down into the dome of the trap, and having suitable hooks for holding bait, and arranged so that a slight pull downward of the cord will trip a loop adjusted in a notch on the top of the pulley, and cause the dome to fall suddenly down on the rabbet of the base; and further, in arranging a bait-cup to slide upon the centre-post, and be operated by the cord which trips the loop, by which means rats will be caught either by pulling the bait or standing on the cup.

In order to give a correct understanding of my device, I will describe the various parts in detail.

F represents the common dome of a wire trap, and is elevated or set at fig. 2, and shut at fig. 1, and has the common decoy door G, arranged in the usual manner. A is a base or stand, having the rabbet E for the rim of dome F to rest in when shut, and is important in keeping it in place, and rats from getting out underneath. Post B is rigidly attached to base A, and is made to guide the dome in its operation, and of such height as will allow the latter to be raised high enough for the rats to pass under. J is a pulley, supported by post B, and has notches K made in its periphery, for holding a loop, H, in position when the trap is set, and one of its arms is made to strike against a pin, $n$, put through fork $m$, and prevent pulley J from being turned in the wrong direction. A cord, I, is attached to pulley J at P, and extends into dome F, and is attached to hooks $o$, used to hold bait. Loop H is attached to the top of dome F, and is arranged to swing easily outward, when tripped from notches K, by means of cord I. Cup C is attached to thimble D, and made to slide on post B, when the trap is being set or sprung.

Operation.

The dome F must be raised up, and the loop H adjusted in notches K, as seen at fig. 2, after which any suitable bait can be put on hooks $o$, and any tempting substance on cup C, and the trap will be sprung by pulling down hooks $o$, or bearing on cup C.

Having thus fully described my device, what I claim, and desire to secure by Letters Patent, is—

The combination of thimble D, cup C, cord I, pulley J, hooks $o$, loop H, and standard B, when constructed substantially as and for the purpose set forth.

H. MANSFIELD.

Witnesses:
JAMES H. CARFORD,
WALTER SCOTT.